L. G. HARDY.
PLANT TOPPER AND CULTIVATOR.
APPLICATION FILED JAN. 17, 1920.
1,373,723.
Patented Apr. 5, 1921.
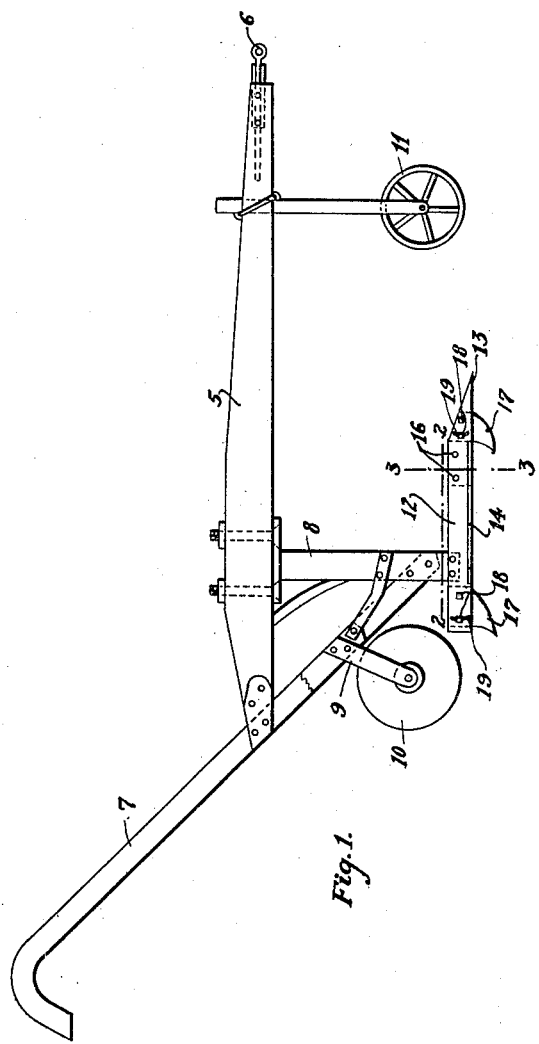
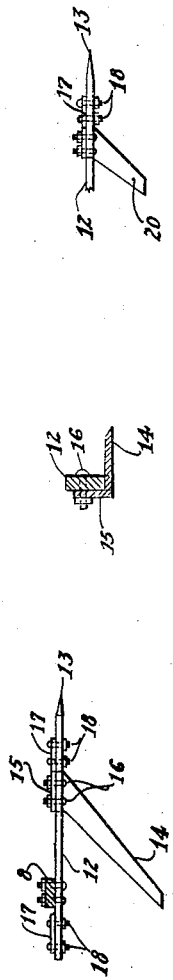
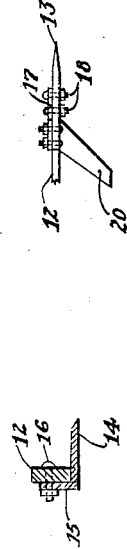
Inventor
Leonard G. Hardy
Attorneys

UNITED STATES PATENT OFFICE.

LEONARD G. HARDY, OF SALT LAKE CITY, UTAH.

PLANT TOPPER AND CULTIVATOR.

1,373,723.

Specification of Letters Patent.

Patented Apr. 5, 1921.

Application filed January 17, 1920. Serial No. 352,192.

*To all whom it may concern:*

Be it known that I, LEONARD G. HARDY, a citizen of the United States, residing at Salt Lake City, in the county of Salt Lake and State of Utah, have invented new and useful Improvements in Plant Toppers and Cultivators, of which the following is a specification.

This invention relates to farming implements, and more particularly an implement for topping beets and which can be used also for cultivating other crops growing in rows.

The object of the invention is to provide a very simple and efficient implement of the kind stated, and to this end it consists in a combination and arrangement of parts to be hereinafter described and claimed.

In order that the invention may be better understood, reference is had to the accompanying drawing forming a part of this specification, and in said drawing, Figure 1 is an elevation of the implement; Fig. 2 is a horizontal section on the line 2—2 of Fig. 1; Fig. 3 is a vertical section on the line 3—3 of Fig. 1, and Fig. 4 is a view similar to Fig. 2 showing a different cutting blade.

Referring specifically to the drawing, 5 denotes a plow beam having at its forward end a clevis 6 for attachment of a draft animal, and provided at its rear end with handles 7 for guiding the implement. From the rear end of the beam 5 depends a standard 8, and back of the standard, one of the handles 7 carries the supporting standard 9 of a revolving cutter disk 10. The front end of the beam 5 is supported by an ordinary gage wheel 11.

To the bottom of the standard 8 is bolted or otherwise rigidly fastened a landside 12, the same having its forward end pointed, as shown at 13.

The landside 12 carries a cutting blade 14 which is set horizontally and extends laterally from the landside. The cutting edge of the blade is in front and it extends at an oblique angle to the line of travel of the implement to make a draw cut. The inner end of the blade 14 has an upturned portion 15 which seats against the inner face of the landside 12, and is bolted thereto as shown at 16.

In front and to the rear of the blade 14 are guide blades 17 which are set vertically and have their forwardly presented edges curved, the same being the cutting edges of the blades. The blades 17 depend a suitable distance below the bottom of the landside 12 so that they may enter the ground when the implement is in operation, whereby the cutting blade 14 is held close to the row of plants being cultivated.

Each blade 17 is bolted to the landside 12 by two bolts 18, one of which latter seats in a curved vertical slot 19 in the landside, to permit adjustment of the blade so as to run level with the landside along the bottom.

When the implement is used for topping beets or other crops, the depth of cutting the tops by the blade 14 is regulated by the disk 10. When weeding and cultivating the cutter blade 14 will be made to run beneath the surface of the ground. The blade 14 passing through the ground forms a fine mulsh tending to greatly conserve the moisture in the soil. The implement is as easy to handle as an ordinary walking plow. Cutting blades of various sizes will be provided according to the character of the work to be done. When topping beets or other crops, the pointed end 13 of the landside 12 runs under the foliage and lifts the same so as to prevent clogging of the blade 14. Fig. 4 shows a cutting blade 20 which is somewhat shorter than the blade 14.

I claim:

1. The combination of a landside, a horizontally positioned cutting blade extending laterally from the landside, and vertically positioned guide blades depending from the landside and positioned in advance and to the rear of said cutting blades.

2. The combination of a landside, a horizontally positioned cutting blade extending laterally from the landside, and vertically positioned guide blades depending from the landside and positioned in advance and to the rear of said cutting blade, said vertical blades having their forward edges curved and sharpened.

3. The combination of a land side, a horizontally positioned cutting blade extending laterally from the landside, and vertically positioned guide blades adjustably fastened to the landside, and positioned in advance of and to the rear of said cutting blade.

In testimony whereof I affix my signature.

LEONARD G. HARDY.